(12) United States Patent
Hurley

(10) Patent No.: US 7,607,624 B1
(45) Date of Patent: Oct. 27, 2009

(54) VALVE TESTER SUSPENSION ASSEMBLY

(75) Inventor: Lyndon J. Hurley, Harrisburg, SD (US)

(73) Assignee: Hurco Technologies, Inc., Harrisburg, SD (US)

( * ) Notice: Subject to any disclaimer, the term of this patent is extended or adjusted under 35 U.S.C. 154(b) by 34 days.

(21) Appl. No.: 10/351,636

(22) Filed: Jan. 24, 2003

(51) Int. Cl.
*E04G 3/00* (2006.01)

(52) U.S. Cl. ............... 248/278.1; 173/184; 175/170

(58) Field of Classification Search ........... 248/278.1, 248/281.11, 282.1, 289.11; 175/170, 162; 172/22, 25; 37/443, 403, 404; 173/184, 173/185, 178
See application file for complete search history.

(56) References Cited

U.S. PATENT DOCUMENTS

| | | | |
|---|---|---|---|
| 1,979,340 A | 11/1934 | Norman | |
| 2,214,389 A | 9/1940 | Wahlmark | |
| 2,548,146 A | 4/1951 | Ferris | |
| 2,548,147 A | 4/1951 | Ferris | |
| 2,746,720 A | 5/1956 | Cannon | |
| 3,093,946 A | 6/1963 | Pitt | |
| 3,417,953 A * | 12/1968 | Hillquist et al. | 248/284.1 |
| 3,565,372 A * | 2/1971 | Jones | 248/647 |
| 3,572,380 A | 3/1971 | Jackson | |
| 4,063,359 A * | 12/1977 | Luscombe | 30/379.5 |
| 4,080,530 A | 3/1978 | Krogsrud | |
| 4,089,448 A | 5/1978 | Traeger | |
| 4,183,489 A * | 1/1980 | Copher et al. | 248/278.1 |
| 4,463,858 A | 8/1984 | Bilas | |
| 4,478,041 A | 10/1984 | Pollman | |
| 4,481,770 A | 11/1984 | Lohbauer et al. | |
| 4,523,286 A | 6/1985 | Koga et al. | |
| 4,561,459 A | 12/1985 | Jackman | |
| 4,600,364 A | 7/1986 | Nakatani et al. | |
| 4,869,002 A | 9/1989 | Glenn | |
| 4,883,249 A | 11/1989 | Garland | |
| 4,961,471 A | 10/1990 | Ovens | |
| 4,987,690 A * | 1/1991 | Aaldenberg et al. | 40/341 |
| 5,299,770 A * | 4/1994 | Sayles | 248/281.11 |
| 5,330,014 A * | 7/1994 | Wagner | 175/18 |
| 5,381,996 A | 1/1995 | Arnemann et al. | |

(Continued)

FOREIGN PATENT DOCUMENTS

EP 0 089 412 A2 9/1983

OTHER PUBLICATIONS

E.H. Wachs Companies, "Truck Mounted Valve Operator Model TM-7", Product Manual, Jan. 2004, pp. 1-55.

(Continued)

*Primary Examiner*—Kimberly T Wood
(74) *Attorney, Agent, or Firm*—Jeffrey A. Proehl; Woods Fuller Shultz & Smith PC

(57) ABSTRACT

A valve tester suspension assembly for allowing one person to perform the tasks necessary to test underground valves includes an articulated arm attached to a mobile base such as a vehicle. The articulated arm may be biased such that the biasing assists in supporting the weight of a rotating assembly positioned at a distal end of the articulated arm. The articulated arm is pivoted to permit positioning of the rotating device in a substantially horizontal orientation at a desired position within a three dimensional space adjacent to the base to which the articulated arm is attached. A method of use is also described.

12 Claims, 12 Drawing Sheets

U.S. PATENT DOCUMENTS

| | | | |
|---|---|---|---|
| 5,503,423 A | 4/1996 | Roberts et al. | |
| 5,540,006 A | 7/1996 | Lloyd | |
| 5,556,217 A * | 9/1996 | Deyo et al. | 403/61 |
| 5,560,130 A | 10/1996 | Bapst | |
| 5,662,176 A * | 9/1997 | Madgwick et al. | 173/185 |
| 5,730,345 A | 3/1998 | Yeckley | |
| 5,746,404 A | 5/1998 | Merko | |
| 5,775,560 A | 7/1998 | Zahn | |
| 5,809,779 A | 9/1998 | Bruso | |
| 5,876,005 A | 3/1999 | Vasconi | |
| 5,937,373 A | 8/1999 | Ferrar | |
| 6,009,905 A | 1/2000 | Arnemann | |
| 6,056,065 A * | 5/2000 | Campbell et al. | 172/42 |
| 6,087,945 A | 7/2000 | Yasuda | |
| 6,125,868 A | 10/2000 | Murphy et al. | |
| 6,129,371 A | 10/2000 | Powell | |
| 6,131,391 A | 10/2000 | Poorman | |
| 6,142,180 A | 11/2000 | Woodling et al. | |
| 6,155,359 A | 12/2000 | Gardner | |
| 6,179,068 B1 | 1/2001 | West | |
| 6,550,734 B1 * | 4/2003 | Spadea | 248/280.11 |
| 6,701,913 B1 | 3/2004 | LeDuc et al. | |
| 7,036,606 B2 | 5/2006 | Rossi | |
| 2001/0053970 A1 | 12/2001 | Ford | |
| 2005/0076965 A1 | 4/2005 | Buckner | |
| 2005/0166350 A1 | 8/2005 | Buckner | |

OTHER PUBLICATIONS

E.H. Wachs Companies, "Wachs ValveCard 1.2", Product Manual, Sep. 1998, pp. 1-26.

The Wachs Company, "Automated Valve Operating Systems", pp. 1-6.

* cited by examiner

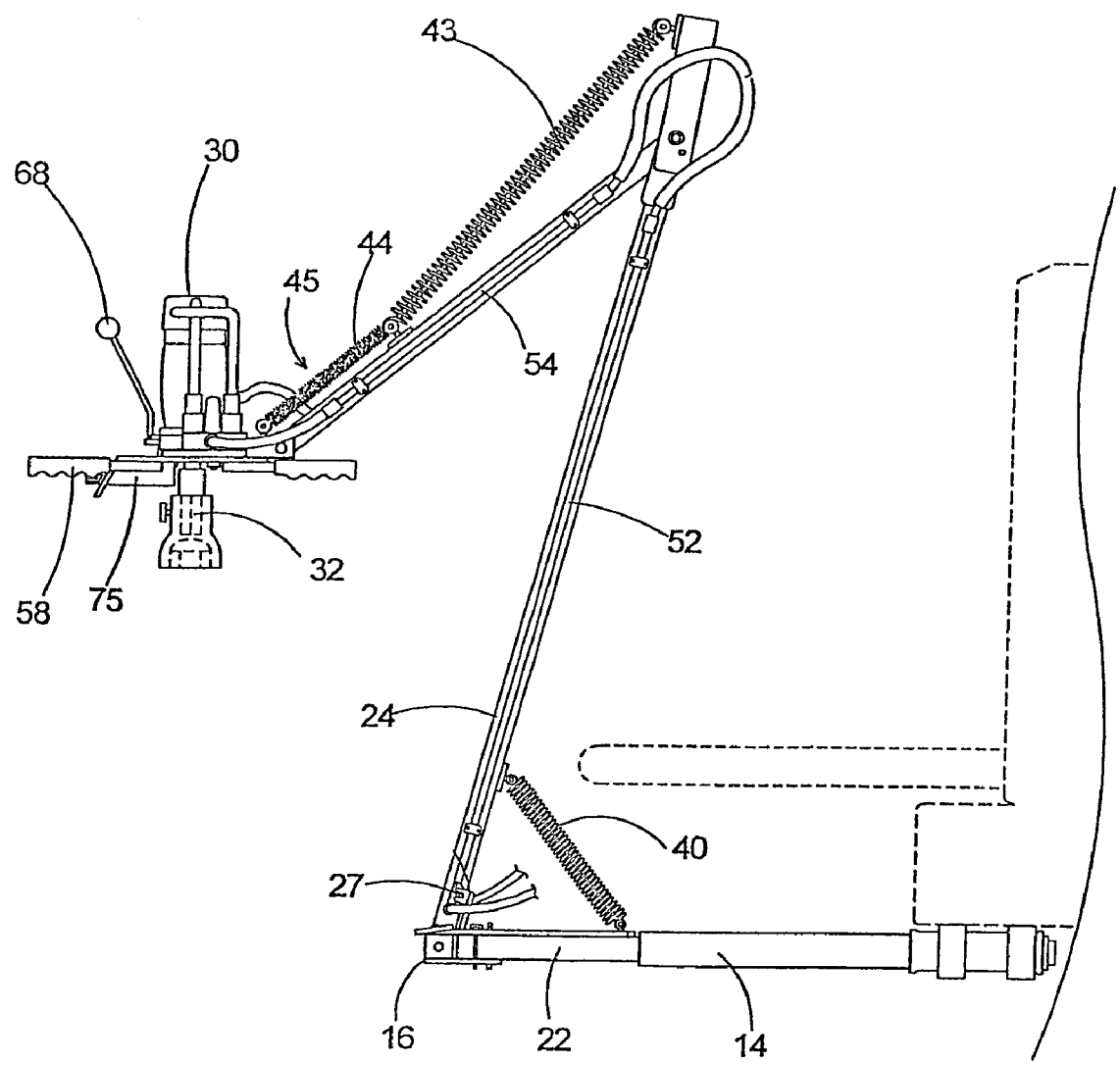

US 7,607,624 B1

VALVE TESTER SUSPENSION ASSEMBLY

BACKGROUND OF THE INVENTION

1. Field of the Invention

The present invention relates to suspension assemblies and more particularly pertains to a new valve tester suspension assembly for allowing one person to perform the tasks necessary to test the underground valves.

2. Description of the Prior Art

The use of suspension assemblies is known in the prior art. U.S. Pat. No. 6,155,359 describes a vehicle mounted post hole digger. Another type of suspension assemblies is U.S. Pat. No. 4,869,002 and U.S. Pat. No. 5,540,006 each disclose a hydraulically operated digging arm attached to a vehicle. U.S. Pat. No. 4,883,249 discloses a counterbalancing mechanism for a constant force or load. U.S. Pat. No. 5,560,130 discloses a trenching apparatus pivotally mounted to a tractor. U.S. Pat. No. 5,746,404 discloses a wire and pulley internal spring counterbalancing mechanism. U.S. Pat. No. 5,876,005 discloses an articulated arm for supporting a camera from the cargo rack of an all-terrain vehicle. U.S. Pat. No. 4,463,858 discloses a reversible portable hoist lacking means for vertically aligning the hook of the device with a desired point on a supporting surface without moving the vehicle. U.S. Pat. No. 5,809,779 discloses an auxiliary hydraulic power unit of the type that would be used in association with the present invention.

While these devices fulfill their respective, particular objectives and requirements, the need remains for a device that can assist in supporting the weight of a rotating assembly used to test underground valves.

SUMMARY OF THE INVENTION

The present invention meets the needs presented above by providing an articulated arm attached to a mobile base such as a vehicle. The articulated arm is biased such that the biasing assists in supporting the weight of a rotating assembly positioned at a distal end of the articulated arm. The articulated arm is pivoted to permit positioning of the rotating device in a horizontal orientation at a desired position within a three dimensional space adjacent to the base to which the articulated arm is attached.

Still yet another object of the present invention is to provide a new valve tester suspension assembly that converts a multiple person job to a job that can be done by a single worker.

Even still another object of the present invention is to provide a new valve tester suspension assembly that increases the efficiency of testing underground valves by making it unnecessary to precisely position a vehicle holding the required rotational device used in the testing.

Yet another object of the present invention is to provide a new valve tester suspension assembly that not only converts a two person job into a one person job, but reduces the physical requirements for the one person, thus reducing the potential for injury or accidents.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 12 is a side view of the present invention in a retracted position.

DESCRIPTION OF THE PREFERRED EMBODIMENT

Figure 1:
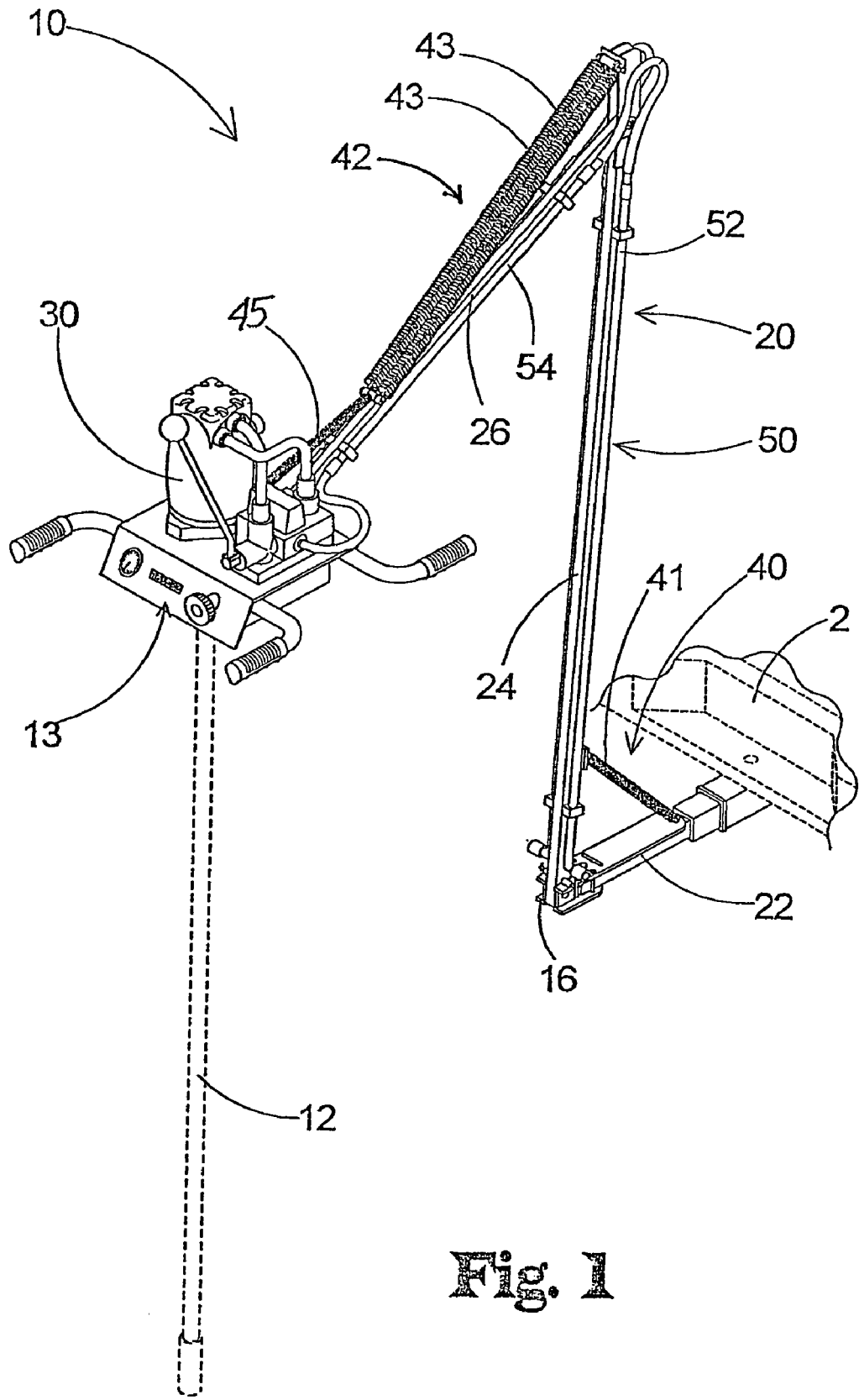
FIG. 1 is a perspective view of a new valve tester suspension assembly according to the present invention.
Figure 2:
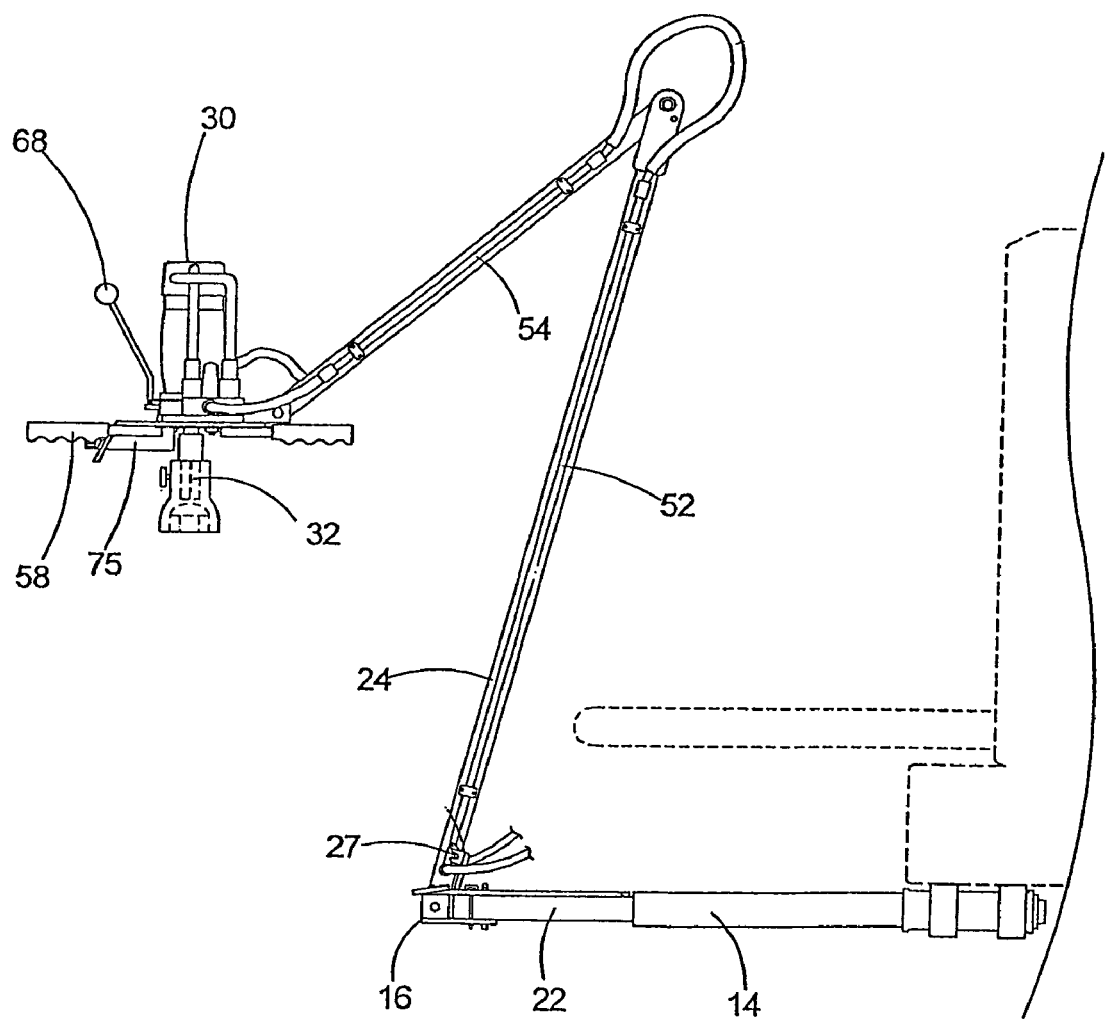
FIG. 2 is a side view of an embodiment of the present invention.
Figure 3:
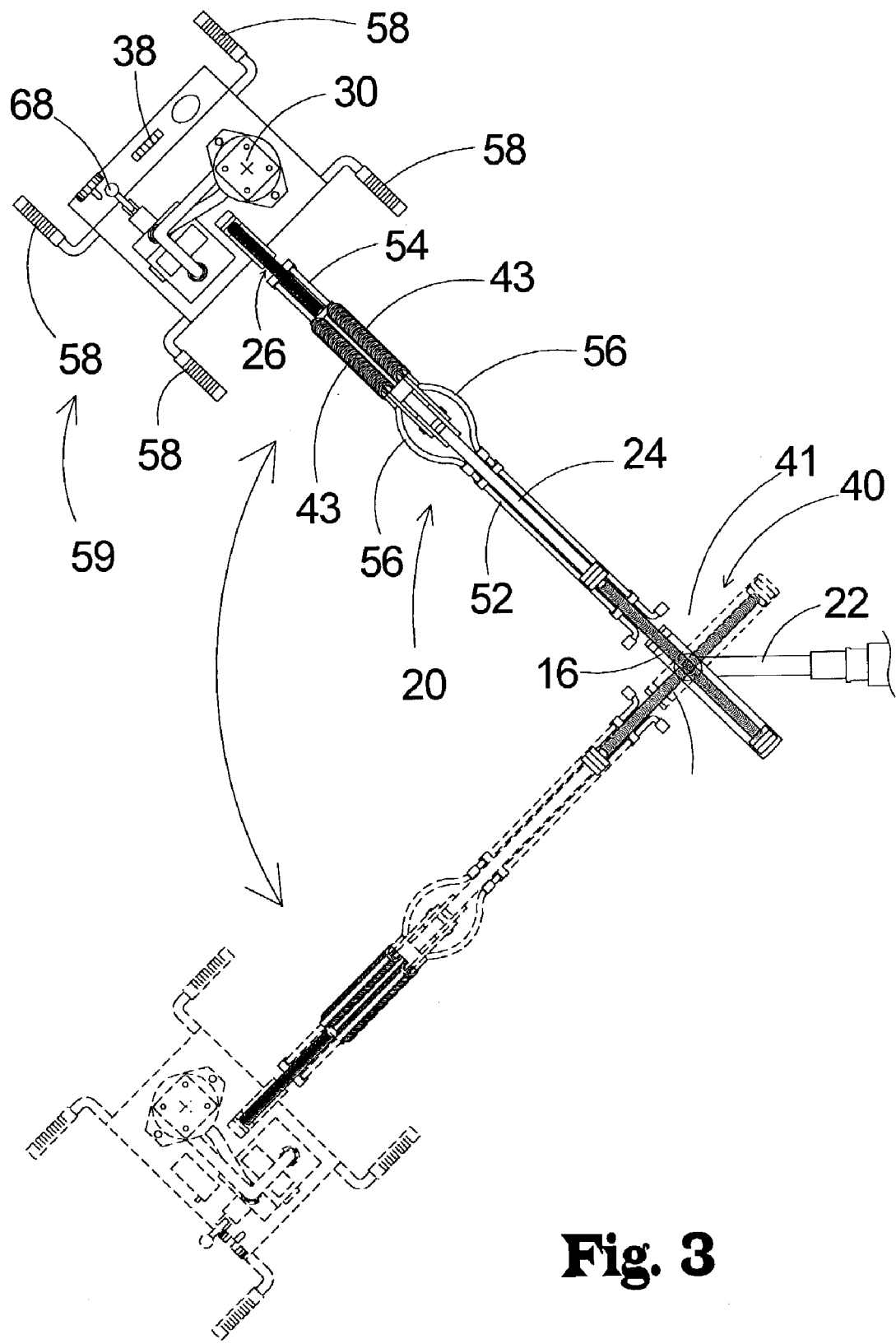
FIG. 3 is a perspective view of the present invention in an extended in use position.
Figure 4:
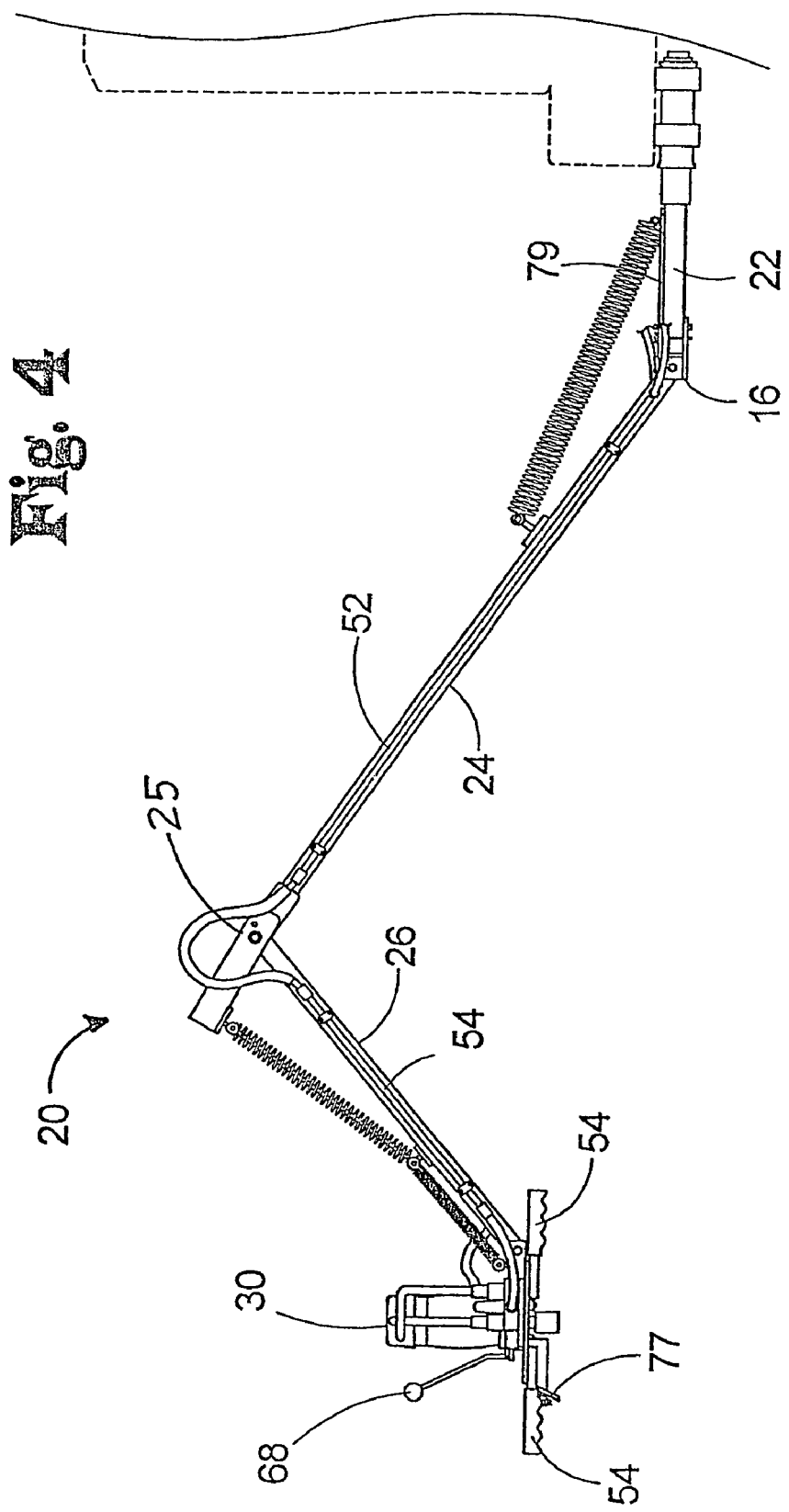
FIG. 4 is a side view of the present invention in an extended position resting on a ground surface.
Figure 5:
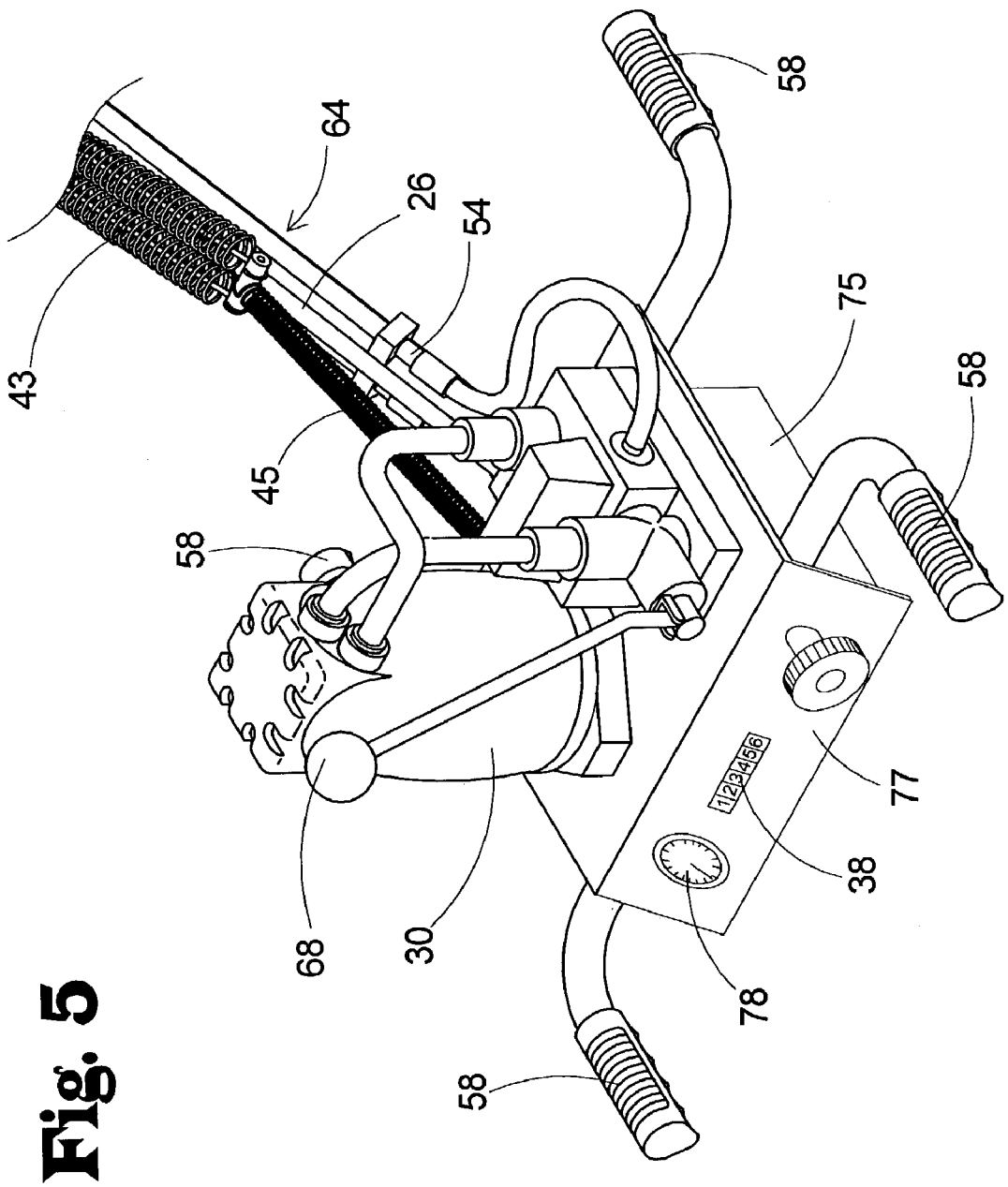
FIG. 5 is a perspective view of the rotating device of the present invention.
Figure 6:
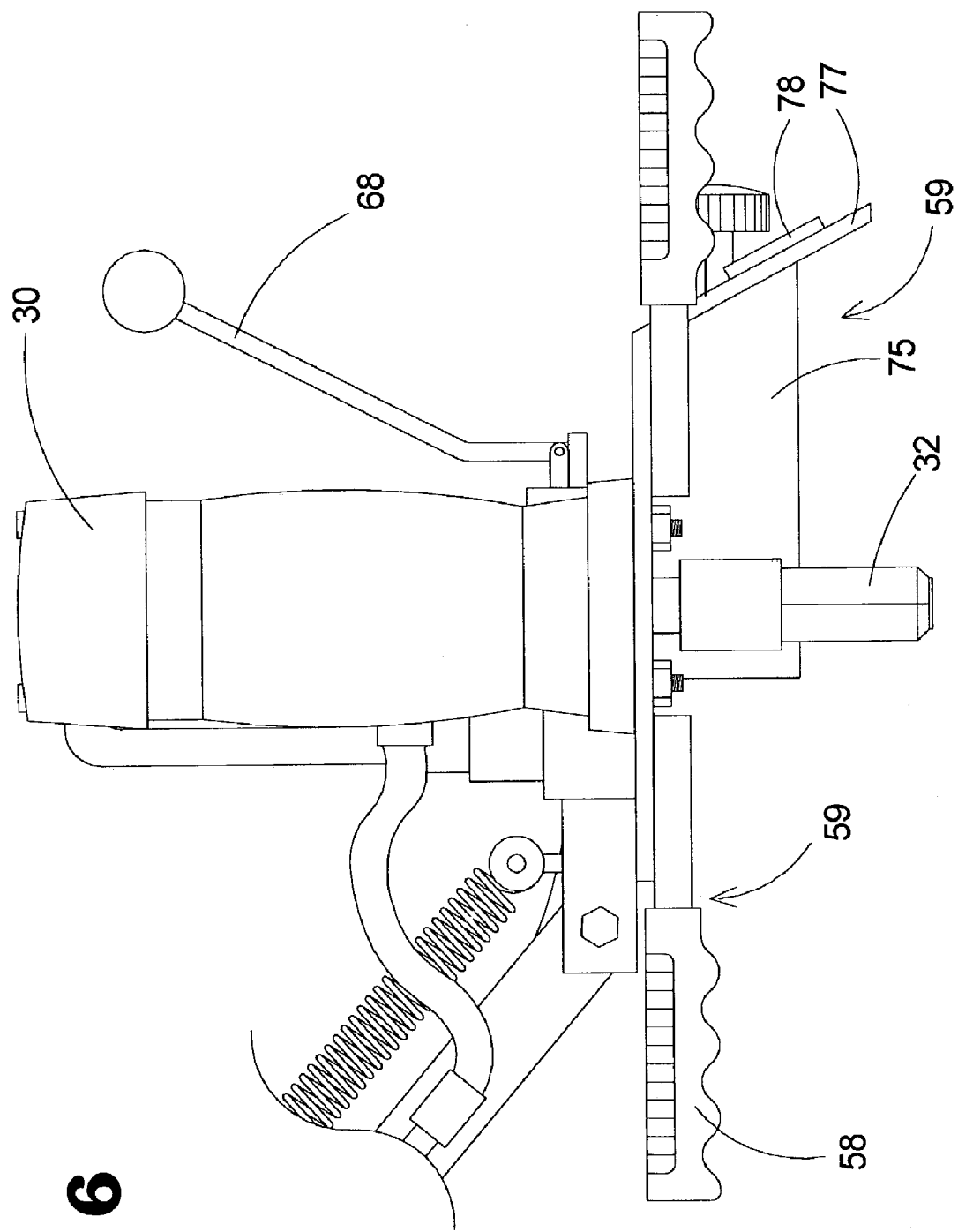
FIG. 6 is a side view of the rotating device of the present invention.

With reference now to the drawings, and in particular to FIGS. 1 through 12 thereof, a new valve tester suspension assembly embodying the principles and concepts of the present invention and generally designated by the reference numeral 10 will be described.

As best illustrated in FIGS. 1 through 12, the valve tester suspension assembly 10 generally comprises an articulated arm assembly 20 designed for coupling to a vehicle 2. A hydraulically powered rotating assembly 30 is pivotally coupled to the arm assembly 20 such that the rotating assembly 30 is positionable in a substantially horizontal orientation at a selectable position in a three dimensional space adjacent the vehicle 2. A shaft 12 is provided having a first end 13 operationally couplable to the rotating assembly 30 for rotating the shaft 12. Typically, the shaft has a receiving portion having a geometric cross-sectional shape for receiving a protrusion 32 rotated by the rotating assembly 30. An adapter 28 is attachable to the protrusion 32 to permit exercising of fire hydrant valves. Alternately, the protrusion may include a geometric cross-sectional receiver portion for engaging fire hydrant valves and the shaft may be shaped to engage the receiver portion of the protrusion.

The arm assembly includes a first arm portion 22 designed for coupling to the vehicle 2 by means such as a hitch on the vehicle. For the purposes of this application, the term vehicle is specifically intended to include any device or structure for transporting persons or things thereby including direct connection to a trailer supporting a hydraulic power source. The arm assembly further includes a second arm portion 24 pivotally and rotatably coupled to a distal end 23 of the first arm portion 22. The arm assembly 20 includes a third arm portion 26 pivotally coupled to a distal portion 25 of the second arm portion 24.

In an embodiment, a first biasing assembly 40 is coupled between the first arm portion 22 and the second arm portion 24. A second biasing assembly 42 is coupled between the second arm portion 24 and the third arm portion 26. A third biasing assembly 44 is coupled between the third arm portion 26 and the rotating assembly 30.

To achieve the pivotal and rotatable coupling between the first and second arm portions, the first arm portion has a pivoting connection portion 16. The second arm portion is pivotally coupled to the connection portion 16. Connection portion 16 further includes an extension portion 79 that extends back adjacent to a main portion 15 of first arm portion 22 when the main portion 15 and the connection portion 16 are positioned in alignment with each other. Biasing means 40 is coupled to the extension portion 79 such that biasing means 40 pivots with second arm portion 24 when connection portion 16 pivots.

Figure 7:
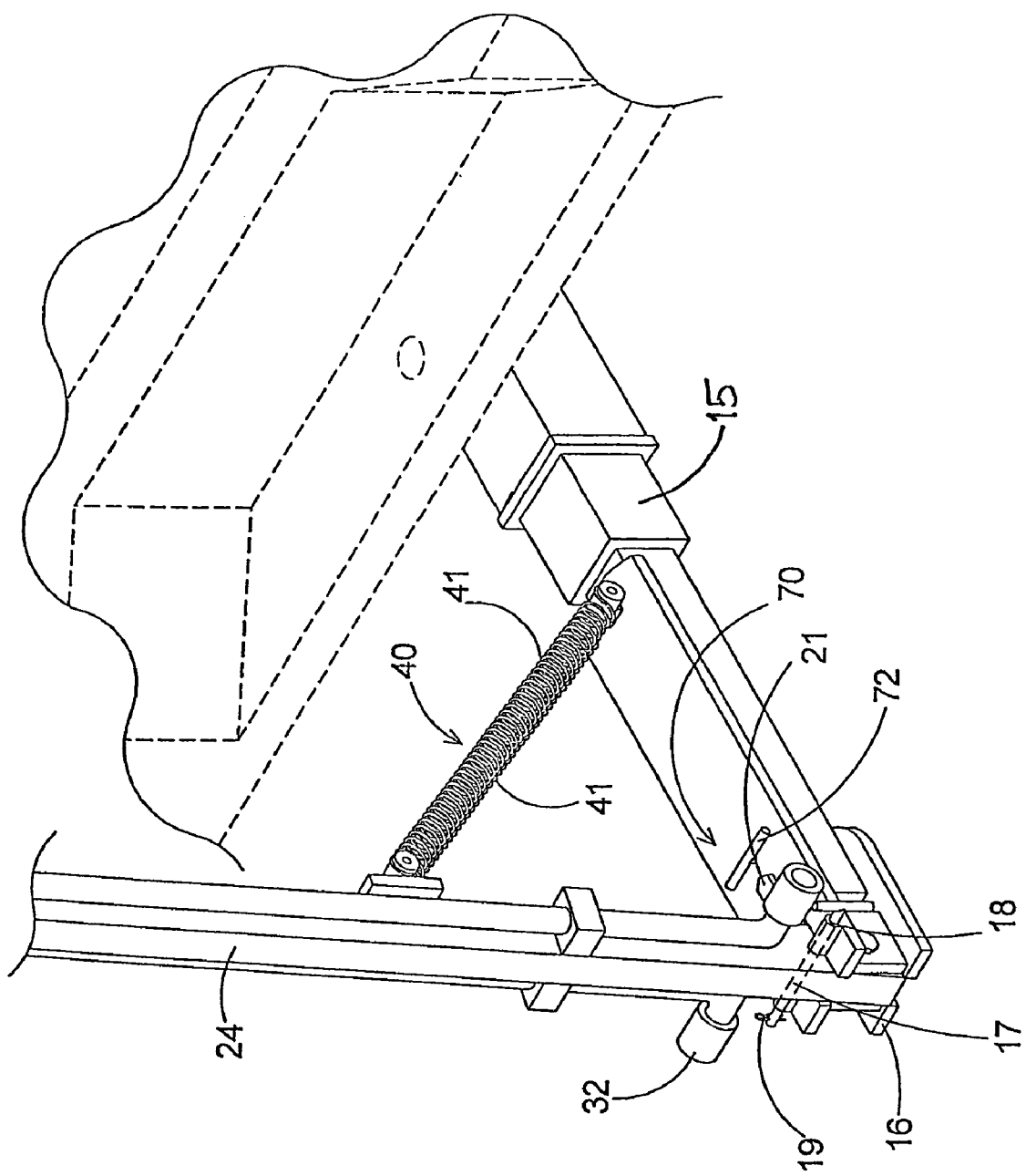
FIG. 7 is a perspective view of a proximal portion of the articulated arm of the present invention.
Figure 8:
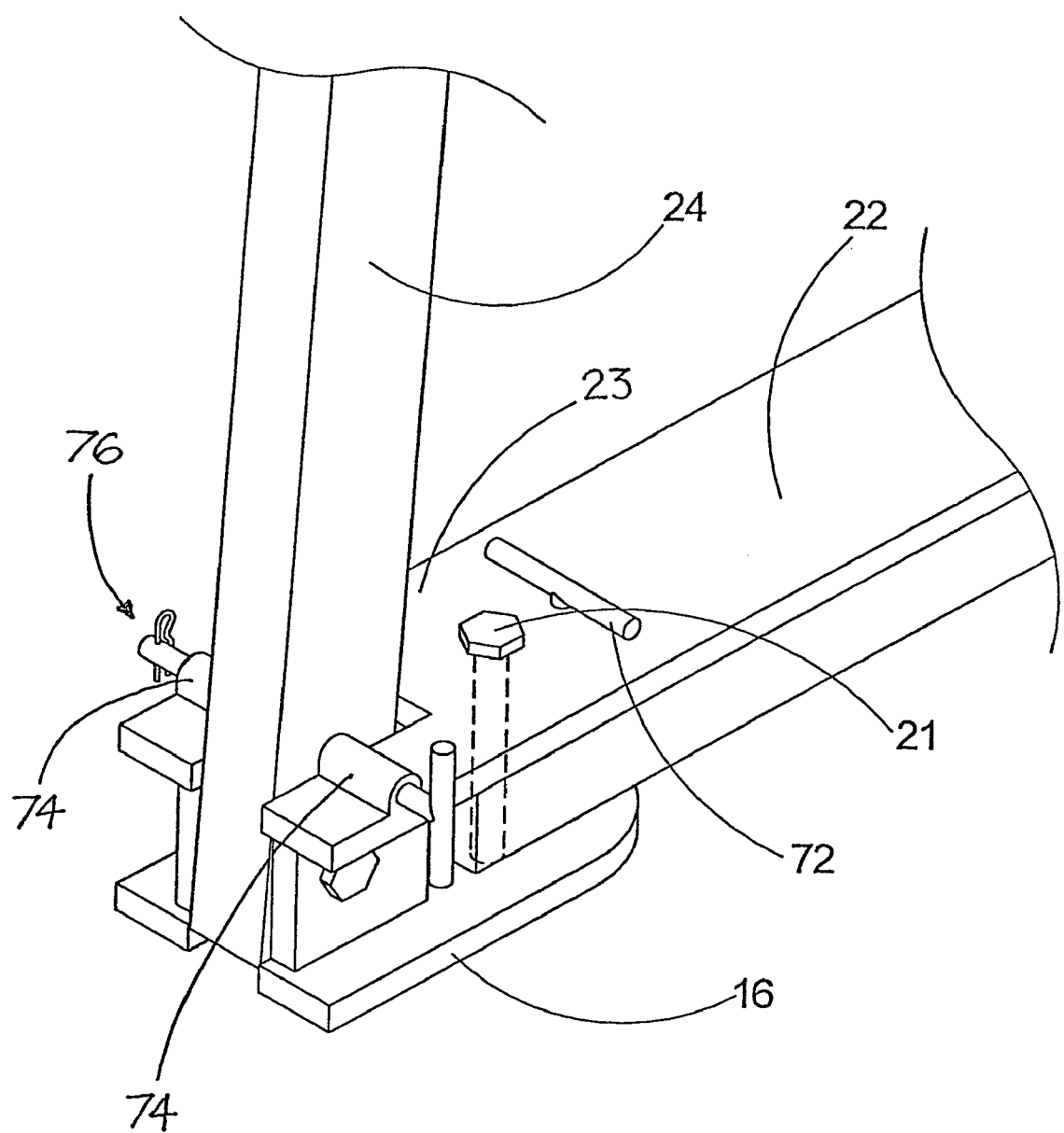
FIG. 8 is a perspective view of a locking means of the present invention.
Figure 9:
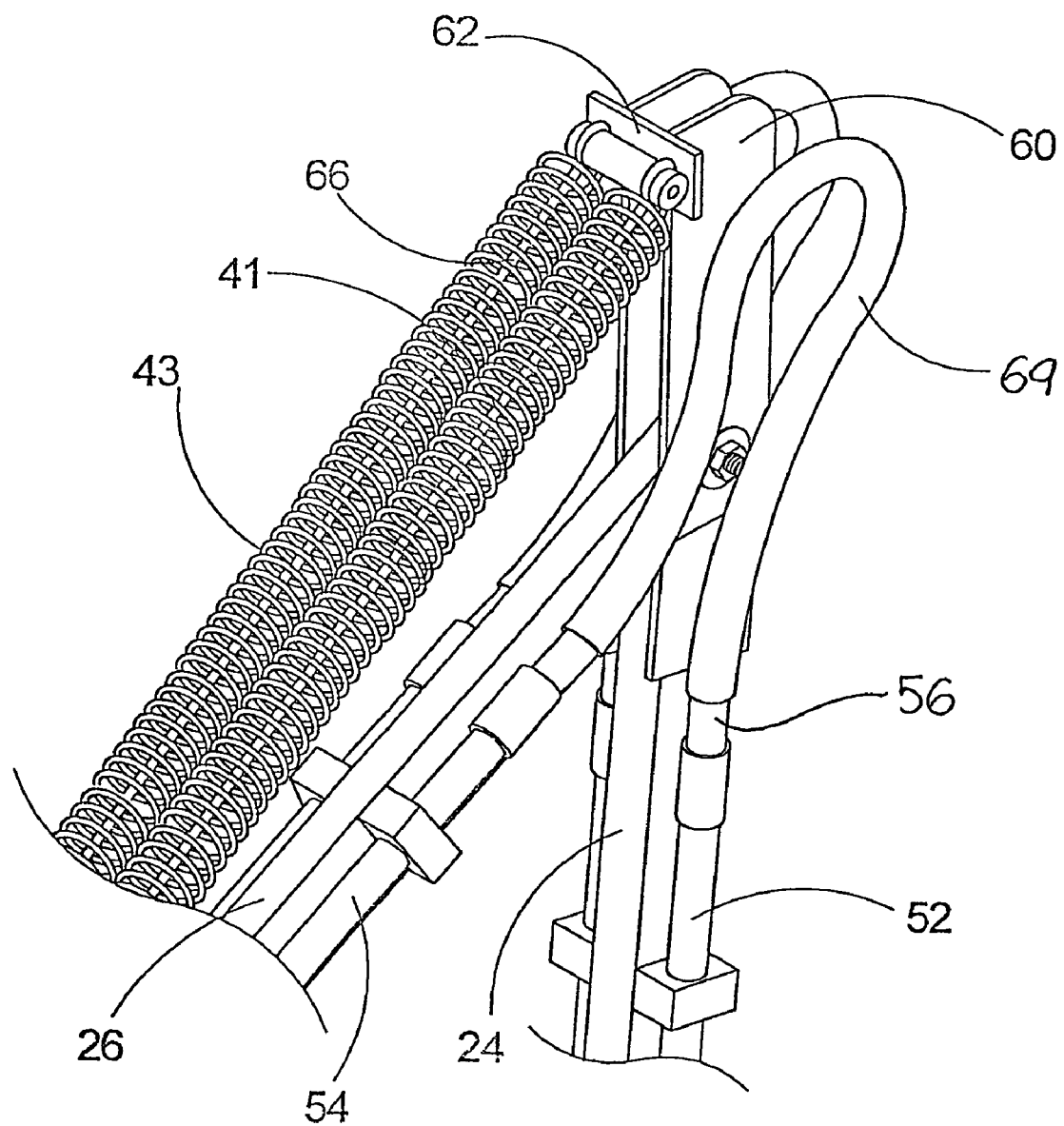
FIG. 9 is a perspective view of a medial portion of the articulated arm of the present invention.
Figure 10:
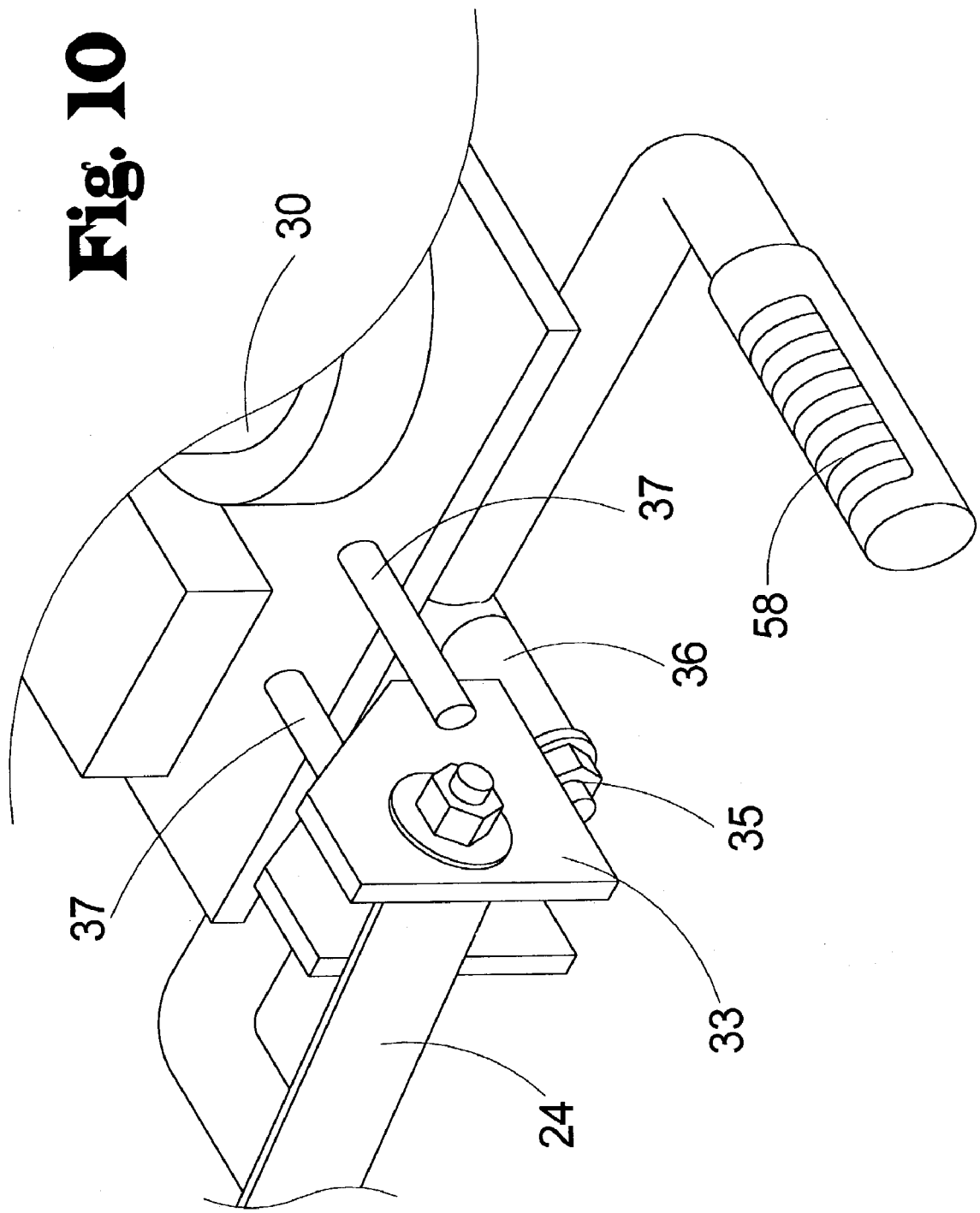
FIG. 10 is a perspective bottom view of an embodiment of the invention.

Hydraulic supply line assemblies 50 are coupled to the arm assembly 20 for providing hydraulic power to the rotating assembly 30. Each hydraulic line assembly includes a first fixed portion 52 coupled to the second arm portion 24. Each hydraulic line assembly 50 further includes a second fixed portion 54 coupled to the third arm portion 26. Each hydraulic line assembly 50 includes a flexible portion 56 coupling the first fixed portion 52 to the second fixed portion 54. A protective covering 69 is coupled to the flexible portion 56 of each hydraulic line assembly 50. Each second fixed portion 54 is operationally coupled to a respective one of an input and an output on the rotating assembly such that each of the hydraulic line assemblies forms either an inlet line or an outlet line. The connectors, as shown in FIG. 7, are differentiated to insure the inlet line and the outlet line are not reversed when connecting the invention to an auxiliary hydraulic power unit.

In the biased embodiment, the first biasing assembly 40 is a pair of first biasing assembly spring members 41 and the second biasing assembly 42 is a pair of second biasing assembly spring members 43. Each of the second pair of second biasing assembly spring members 43 is coupled between a distal end 60 of an extension portion 62 of the second arm portion 24 and a medial portion 64 of the third arm portion 26. Extension portion 62 may be a separate piece attached to second arm portion 24 or may be an integral extension of second arm portion 24. The third biasing assembly 44 is a single third biasing assembly spring member 45.

To enhance the safety of the biased embodiment in the event of catastrophic failure of a spring member, each spring member of the first, second and third biasing assemblies has a respective elastic core member 66 extending through the spring member.

A hydraulic control mechanism 68 is coupled to the rotating assembly 30 for facilitating user operation of the rotating assembly 30. Corresponding to the currently used practice for testing underground valves, a counter 38 is coupled to a display flange 77 of the rotating assembly 30 for counting rotations of the shaft 12. Additionally, a torque indicator gauge 78 is operationally coupled to the rotating assembly to indicate torque on the rotating assembly. This provides a new method of testing alternative to counting rotations of the shaft. A torque adjustment means 75 is operationally coupled to the rotating assembly for adjusting the amount of torque applied by the rotating assembly 30 to prevent overstressing of the valve assembly being exercised.

A first locking means 70 is provided for locking the second arm portion 24 from rotating relative to the first arm portion 22. A second locking means 76 is provided for locking the second arm portion 24 from pivoting relative to the first arm portion 22.

The first locking means 70 is a pin 72 insertable through the first arm portion 22 and the connection portion 16 in spaced relationship to a rotational pivot point 21 of the connection portion 16. Thus, the connection portion 16 is held in position by pin 72.

Figure 11:
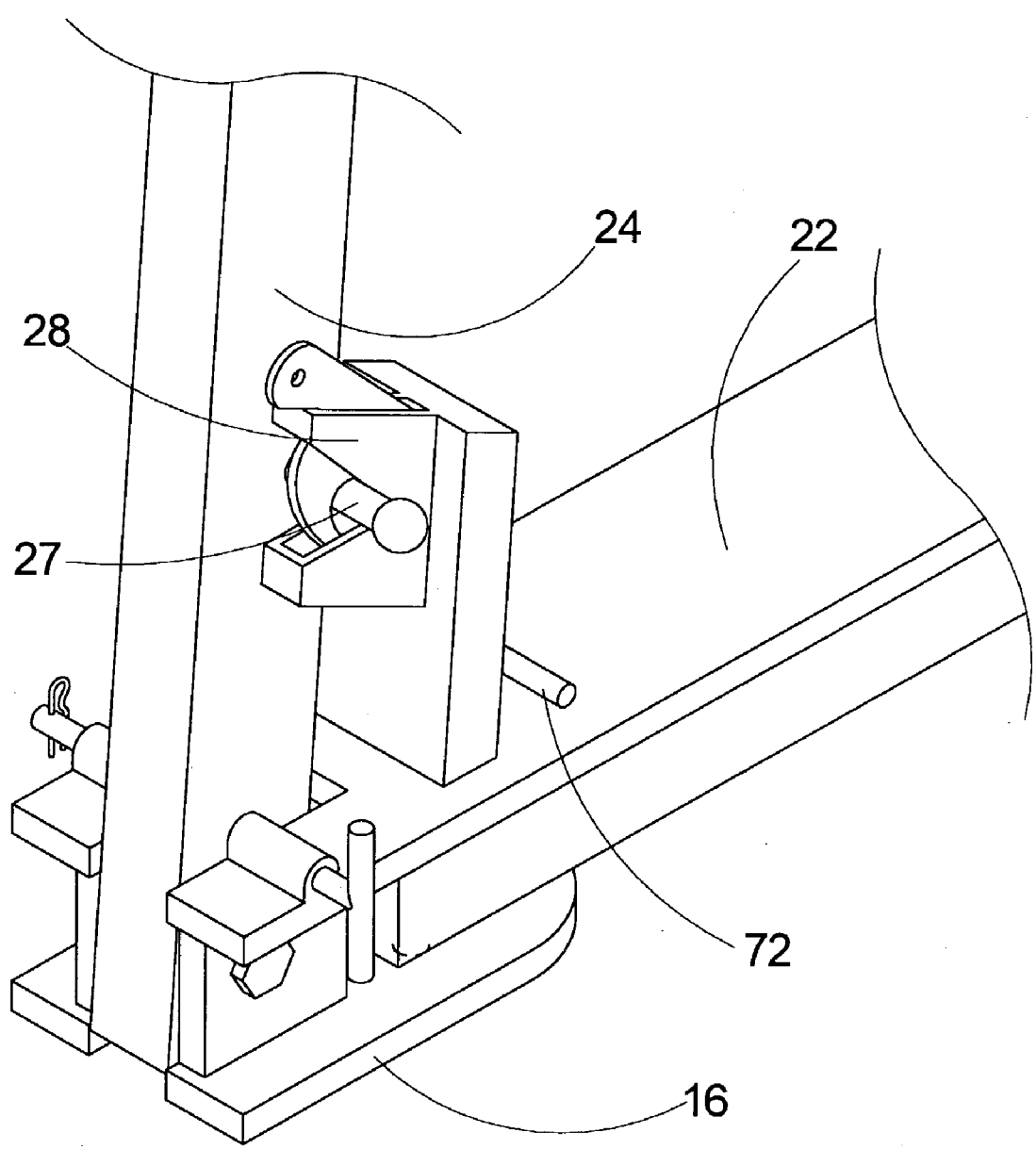
FIG. 11 is a perspective view of an alternate locking means for the articulated arm assembly.

The second locking means 76 includes a pair of aligned holed flanges 74 in the connection portion 16 of the first arm portion 22. The second arm portion 24 includes a locking aperture 17 alignable with holes 18 in the flanges 74. A locking pin 19 is insertable through the aligned holes 18 and aperture 17 whereby the second arm 24 is prevented from pivoting relative to the connection portion 16 of the first arm portion 22. Additionally, in an embodiment, the second locking means 76 may be a locking bar 27 extending from the second arm portion 24 for engaging a latch member 28 fixedly coupled to the first arm portion 22 as shown in FIG. 11. The locking bar and latch member may be used alone for securing the arm assembly during relatively short trips between valve sites or in combination with the locking pin 19 and aligned holes 18 for maximum stability as desired. The invention may include either one of the above described locking structures or both in combination as each provides unique advantages.

Optionally, an extension member 14 is couplable between the articulated arm assembly 20 and the vehicle 2 for spacing the second arm portion 24 from the vehicle 2 to permit free movement of the second arm portion 24 when a tailgate of the vehicle is in an open position.

A plurality of handles 58 are coupled to the rotating assembly 30 for facilitating grasping and movement of the rotating assembly 30. The handles 58 are being arranged to form two opposing handle pairs 59. The handle pairs 59 are substantially aligned with respect to each other.

In an embodiment, the rotating assembly 30 is coupled to the articulated arm assembly such that the rotating assembly is pivotable around a horizontal axis to permit positioning of the rotating assembly 30 in a desired position to engage valves that are not in perfect horizontal alignment such that the shaft is in a non-vertical position when engaged to the valve. The coupling of the rotating assembly 30 is achieved by having a post 35 extend from the rotating portion. A rotating assembly connection member 33 includes a bearing portion 36 secured to the post 35 and a pair of limiting bars 37 that extend out from the rotating assembly connection member 33 to contact the rotating assembly to limit the pivoting range of the rotating assembly around the horizontal axis.

In use, the articulated arm assembly is coupled to a vehicle using a conventional hitch mounted anywhere on the vehicle including the front or back. The vehicle can be driven to a position adjacent an access port in the road that gives access to an underground valve. The invention permits positioning of the vehicle anywhere within a range of the access port so that the vehicle does not have to be moved to precisely align the rotating device with the access port. Typically, the valve being tested is positioned a distance beneath the road, often 4 to six feet. A shaft, which may have an adjustable length either by being telescopic or having a one or more extension pieces, is engaged to the valve. The articulated arm is unlocked to permit free movement of the arm by a single person. The rotating device, typically a heavy hydraulically powered device, is then grasped and may be positioned by a single person.

When the biasing assemblies are used the weight of the rotating device is partially supported by the biasing in the articulated arm. Adjustments to the amount of support can be achieved through the use of multiple interchangeable springs or other known methods of varying the resistance of a biasing member.

The pivoting of the articulated arm permits movement of the rotating device within a three dimensional space while holding the rotating device in the necessary substantially horizontal orientation. Additional pivoting of the rotating device is provided to facilitate attachment of the rotating device to shafts when the shaft is slightly off vertical orientation as may happen when the valve is in a slightly tilted position. The rotating device can be positioned immediately over the shaft and then lowered to engage the shaft. The rotating device remains in engagement with the shaft by the residual weight of the rotating device not supported by the articulated arm or the user. The user may also push downwardly on the rotating device during use if desired or otherwise deemed necessary.

Typically, the testing is done by loosening and re-tightening a number of rotations. In an embodiment, a counter is used to count the number of rotations to facilitate the current testing methods. Alternately, torque measurement style testing is now facilitated by the present invention if the invention is equipped for measuring or responding to pre-determined torque conditions during rotation. Upon completion of the testing, the rotating device is disengaged from the shaft and the articulated arm returned to a storage or retracted position and then locked into place to permit safe movement of the vehicle to the next testing place. This new method provides a significant increase in efficiency allowing many more valves to be tested in a given amount of time.

Through use of the adapter described above or through integral shaping of the protrusion of the rotating device, the rotating device may also be engaged to fire hydrant valves as desired.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Further, unless particular features are mutually exclusive, all of the various combinations of the features are intended to be encompassed by the invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A valve tester suspension assembly comprising:
an articulated arm assembly adapted for coupling to a vehicle;
a rotating assembly coupled to said arm assembly to pivot around a substantially horizontal axis such that said rotating assembly is positionable in a substantially horizontal orientation at a selectable position in a three dimensional space adjacent the vehicle; and
a shaft having a first end operationally couplable to said rotating assembly for rotating said shaft;
a torque adjustment means operationally coupled to said rotating assembly for permitting adjustment of a torque exerted by said rotating assembly to turn said shaft;
said arm assembly including a first arm portion for coupling to the vehicle;
said arm assembly including a second arm portion pivotally coupled to said first arm portion;
said arm assembly including a third arm portion pivotally coupled to a distal portion of said second arm portion;
a first biasing assembly coupled between said second arm portion and said third arm portion; and
a biasing assembly coupled between said third arm portion and said rotating assembly;
said second biasing assembly comprising at least one spring member.

2. A valve tester suspension assembly comprising:
an articulated arm assembly adapted for coupling to a vehicle;
a rotating assembly coupled to said arm assembly to pivot around a substantially horizontal axis such that said rotating assembly is positionable in a substantially horizontal orientation at a selectable position in a three dimensional space adjacent the vehicle; and
a shaft having a first end operationally couplable to said rotating assembly for rotating said shaft;
a torque adjustment means operationally coupled to said rotating assembly for permitting adjustment of a torque exerted by said rotating assembly to turn said shaft;
said arm assembly including a first arm portion adapted for coupling to the vehicle;
said arm assembly including a second arm portion pivotally and rotatably coupled to said first arm portion;
a first biasing assembly coupled between said first arm portion and said second arm portion;
said arm assembly including a third arm portion pivotally coupled to a distal portion of said second arm portion;
a second biasing assembly coupled between said second arm portion and said third arm portion; and
a third biasing assembly coupled between said third arm portion and said rotating assembly;
said second biasing assembly comprising a pair of second biasing assembly spring members;
each of said second pair of second biasing assembly spring members being coupled between a distal end of an extension portion of said second arm portion and a medial portion of said third arm portion.

3. The valve tester suspension assembly comprising:
an articulated arm assembly adapted for coupling to a vehicle;
a rotating assembly coupled to said arm assembly to pivot around a substantially horizontal axis such that said rotating assembly is positionable in a substantially horizontal orientation at a selectable position in a three dimensional space adjacent the vehicle; and
a shaft having a first end operationally couplable to said rotating assembly for rotating said shaft;
a torque adjustment means operationally coupled to said rotating assembly for permitting adjustment of a torque exerted by said rotating assembly to turn said shaft;
said arm assembly including a first arm portion adapted for coupling to the vehicle;
said arm assembly including a second arm portion pivotally coupled to said first arm portion;
a first biasing assembly coupled between said first arm portion and said second arm portion;
said arm assembly including a third arm portion pivotally coupled to a distal portion of said second arm portion;
a second biasing assembly coupled between said second arm portion and said third arm portion; and a third biasing assembly coupled between said third arm portion and said rotating assembly;

said third biasing assembly comprising a spring member.

4. A valve tester suspension assembly comprising:

an articulated arm assembly adapted for coupling to a vehicle;

a rotating assembly coupled to said arm assembly to pivot around a substantially horizontal axis such that said rotating assembly is positionable in a substantially horizontal orientation at a selectable position in a three dimensional space adjacent the vehicle; and a shaft having a first end operationally couplable to said rotating assembly for rotating said shaft;

said arm assembly including a first arm portion adapted for coupling to the vehicle;

said arm assembly including a second arm portion pivotally coupled to said first arm portion;

a first locking means for locking a second arm portion from rotating relative to a first arm portion; and a second locking means for locking said second arm portion from pivoting relative to said first arm portion.

5. The valve tester suspension assembly of claim 4, further comprising:

said first locking means comprising a pin insertable through said first arm portion and a connection portion of said first arm portion to which said second arm portion is coupled, said pin being insertable in spaced relationship to a rotational pivot point of said connection portion whereby said connection portion is held in a static position relative to said main portion of said first arm portion by said pin.

6. The valve tester suspension assembly of claim 4, further comprising:

said first arm portion having a pair of aligned holed flanges;

said second arm having a locking aperture alignable with holes in said flanged; and a locking pin insertable through said aligned holes and aperture whereby said second arm is prevented from pivoting relative to said first arm portion.

7. A valve tester suspension assembly comprising:

an articulated arm assembly adapted for coupling to a vehicle;

a rotating assembly coupled to said arm assembly to pivot around a substantially horizontal axis such that said rotating assembly is positionable in a substantially horizontal orientation at a selectable position in a three dimensional space adjacent the vehicle; and a shaft having a first end operationally couplable to said rotating assembly for rotating said shaft;

a torque adjustment means operationally coupled to said rotating assembly for permitting adjustment of a torque exerted by said rotating assembly to turn said shaft;

said arm assembly including a first arm portion adapted for coupling to the vehicle, said first arm portion having a main portion and a connection portion pivotally coupled to said main portion;

said arm assembly including a second arm portion pivotally coupled to said connection portion of said first arm portion;

said connection portion including an extension portion extending back adjacent to said main portion of said first arm portion when said main portion and said connection portion are positioned in alignment with each other; and a first biasing assembly coupled between said extension portion of said connection portion and said second arm portion.

8. A valve tester suspension assembly comprising:

an articulated arm assembly adapted for coupling to a vehicle;

a rotating assembly coupled to said arm assembly to pivot around a substantially horizontal axis such that said rotating assembly is positionable in a substantially horizontal orientation at a selectable position in a three dimensional space adjacent the vehicle; and a shaft having a first end operationally couplable to said rotating assembly for rotating said shaft;

said rotating assembly being coupled to said articulated arm assembly such that said rotating assembly is pivotable around a second horizontal axis to permit alignment of said rotating assembly with said shaft when said shaft is in a non-vertical position;

said rotating assembly including a post extending from said rotating assembly;

a rotating assembly connection member having a bearing portion secured to said post to permit pivoting of said rotating assembly around said second horizontal axis.

9. A valve tester suspension assembly comprising:

an articulated arm assembly adapted for coupling to a vehicle;

a rotating assembly coupled to said arm assembly to pivot around a substantially horizontal axis such that said rotating assembly is positionable in a substantially horizontal orientation at a selectable position in a three dimensional space adjacent the vehicle; and a shaft having a first end operationally couplable to said rotating assembly for rotating said shaft;

said rotating assembly being coupled to said articulated arm assembly such that said rotating assembly is pivotable around a second horizontal axis to permit alignment of said rotating assembly with said shaft when said shaft is in a non-vertical position;

wherein said second horizontal axis is orthogonal to said first horizontal axis.

10. The valve tester suspension assembly of claim 8, further comprising:

said rotating assembly connection member including a pair of limiting bars extending from said rotating assembly connection member, said limiting bars being positioned for contacting said rotating assembly to limit a range of pivoting by said rotating assembly around said second horizontal axis.

11. A valve tester suspension assembly comprising:

an articulated arm assembly adapted for coupling to a vehicle;

a rotating assembly coupled to said arm assembly to pivot around a substantially horizontal axis such that said rotating assembly is positionable in a substantially horizontal orientation at a selectable position in a three dimensional space adjacent the vehicle; and a shaft having a first end operationally couplable to said rotating assembly for rotating said shaft;

a torque adjustment means operationally coupled to said rotating assembly for permitting adjustment of a torque exerted by said rotating assembly to turn said shaft;

said rotating assembly including a protrusion, said protrusion being adapted for operationally coupling to a fire hydrant valve for permitting testing of the fire hydrant valve.

12. The valve tester suspension assembly of claim 1 additionally comprising a torque indicator operationally coupled to said rotating assembly for indicating a torque exerted by said rotating assembly to turn said shaft.

* * * * *